United States Patent [19]

Clegg

[11] Patent Number: 4,598,987
[45] Date of Patent: Jul. 8, 1986

[54] CONIC CAMERA

[76] Inventor: John E. Clegg, 2320 Keystone Dr., Orlando, Fla. 32806

[21] Appl. No.: 674,805

[22] Filed: Nov. 26, 1984

[51] Int. Cl.[4] .............................................. G03B 17/00
[52] U.S. Cl. ...................................... 354/202; 354/288
[58] Field of Search ..................... 354/62, 63, 106, 75, 354/76, 202, 150, 159, 110, 115, 195.1, 118, 120, 122, 288, 295, 296; 355/1, 33, 46, 54; 350/432, 447, 276 R, 276 SL, 580, 581, 319

[56] References Cited

U.S. PATENT DOCUMENTS

| | | | |
|---|---|---|---|
| 1,479,112 | 1/1924 | Sparks | 354/202 |
| 1,633,373 | 6/1927 | Gregier | 354/202 X |
| 2,373,936 | 4/1945 | Wright | 354/110 |
| 2,811,081 | 10/1957 | Praeger | 354/195.1 X |
| 3,774,992 | 11/1973 | Steiner | 354/296 X |
| 3,886,544 | 5/1975 | Narodny | 350/432 X |
| 3,950,769 | 4/1976 | Yevick | 354/120 X |
| 3,995,288 | 11/1976 | Yevick | 354/120 X |
| 4,168,900 | 9/1979 | Adachi | 355/1 |
| 4,175,844 | 11/1979 | Glaser-Inbari | 354/110 |
| 4,331,380 | 5/1982 | Rees et al. | 355/1 X |

FOREIGN PATENT DOCUMENTS 2047610 3/1972 Fed. Rep. of Germany ...... 350/580

*Primary Examiner*—William B. Perkey

[57] ABSTRACT

A non-focusing camera featuring a conical louver and a plano-convex conical objective. The louver consists of a series of graduated concentric conical louvers with radial fins interposed. The conical louvers select rays of required inclination to the lens and intercept other rays. The selected rays are refracted first by the plano face of the lens and second by the convex conical face and projected onto the film which is placed close to the lens. The rays forming the image are afocal.

1 Claim, 2 Drawing Figures

CONIC CAMERA

BACKGROUND OF THE INVENTION

The invention relates to non-focusing photographic lenses, specifically to conical lenses.

Prior spherical-lens art is concerned primarily with spherical lenses which project rays through a focal point onto a film placed a distance away from the lens.

Prior conical-lens art includes the *Conical Beam Concentrator,* U.S. Pat. No. 4,333,713, June 8, 1982, by this inventor. The upper component lens of this invention has a plano face which receives an incident beam which is perpendicular to the face and a convex conical face which refracts the incident beam, forming a convergent conical beam.

SUMMARY

The features which render the invention distinct from prior spherical-lens art are the conical lens and the placement of the filmless than 0.5 mm behind the lens. The latter feature is one of necessity, not choice, because the rays forming the central point of the image begin to diverge upon being emitted from the vertex of the convex conical face of the lens.

DESCRIPTION OF THE PREFERRED EMBODIMENT

There are three elements which are necessary to the understanding of the invention; the louver, the conical lens and the film. All other features are excluded from the specification and drawings as being non-essential. Only the lens and the position of the film relative to the lens are claimed as patentable.

Figure 1:
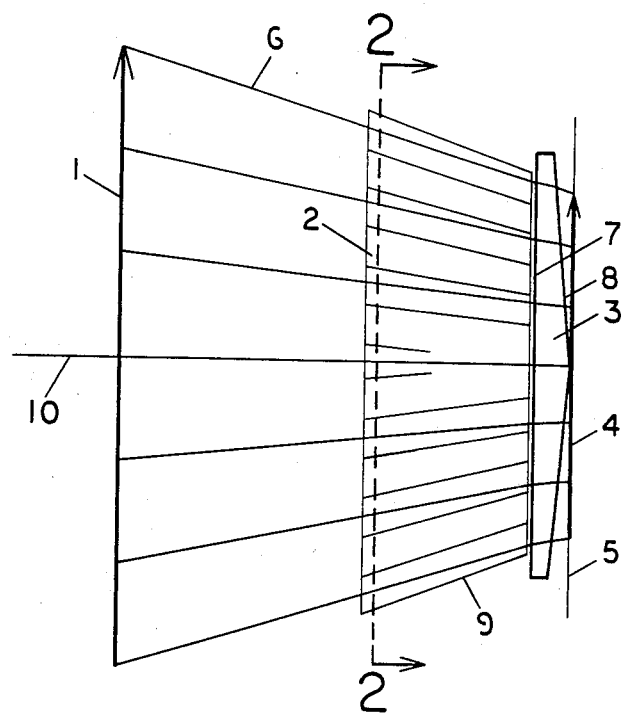
FIG. 1 is an elevation of the conic camera with a ray diagram.
Figure 2:
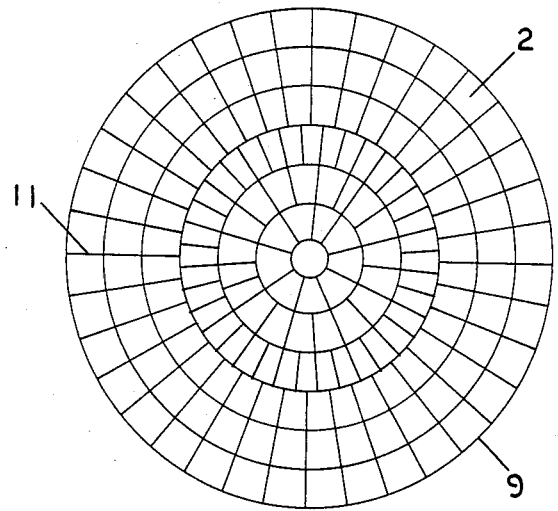
FIG. 2 is a cross section of the louver taken on line 2—2 of FIG. 1.

FIG. 1 is an elevation of the conic camera with a ray diagram showing object 1, conical louver 2, plano-convex conical lens 3 and image 4 projected onto film 5.

Convergent rays 6 of the object 1 are admitted by conical louver 2 comprising a series of graduated concentric conical louvers 9 with radial fins 11 interposed between the louvers.

Convergent rays 6 of the object are refracted by plano face 7 and by convex conical face 8, forming a convergent conical beam which is projected onto film 5. The film 5 must be positioned in proximity to the lens (less than 0.5 mm from the vertex of the convex conical face 8) so that the rays which cross at the vertex do not diverge and overlap.

The type of image received by the conical lens 3 is determined by the angles of inclination of the conical louvers 9 from the optic axis. The angle of inclination of the louvers is large for images of a near object, as shown in FIG. 1, and small for a distant object. In practice four or more movable louvers of varying angles of inclination will be mounted on the front of the camera, and a certain louver will be selected and moved in front of the lens for an object which is a given distance from the camera.

I claim:

1. A conic camera comprising a conical lens (3) having a front plano face (7) and a rear convex conical face (8) which receive and refract convergent conical rays (6) of an object (1), forming a convergent conical beam which is projected onto a film (4) mounted parallel to and less than 0.5 mm from the apex of the convex conical face (8) of the conical lens (3).

* * * * *